United States Patent
Sun et al.

(10) Patent No.: US 11,206,688 B2
(45) Date of Patent: Dec. 21, 2021

(54) NETWORK ACCESS METHOD FOR LOW POWER TERMINAL, AND APPARATUS

(71) Applicant: Huawei Technologies Co., Ltd., Shenzhen (CN)

(72) Inventors: Yanliang Sun, Shenzhen (CN); Nathan Edward Tenny, San Diego, CA (US); Yongbo Zeng, Beijing (CN); Yu Cai, Beijing (CN); Bin Liu, San Diego, CA (US); Da Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 16/310,202

(22) PCT Filed: Jun. 16, 2016

(86) PCT No.: PCT/CN2016/086045
§ 371 (c)(1),
(2) Date: Dec. 14, 2018

(87) PCT Pub. No.: WO2017/214933
PCT Pub. Date: Dec. 21, 2017

(65) Prior Publication Data
US 2019/0254075 A1   Aug. 15, 2019

(51) Int. Cl.
*H04W 74/08* (2009.01)
*H04W 74/02* (2009.01)
(Continued)

(52) U.S. Cl.
CPC ..... *H04W 74/0833* (2013.01); *H04W 72/005* (2013.01); *H04W 72/044* (2013.01);
(Continued)

(58) Field of Classification Search
None
See application file for complete search history.

(56) References Cited

U.S. PATENT DOCUMENTS

| 9,769,862 B2* | 9/2017 | Sheng | H04W 76/14 |
|---|---|---|---|
| 2014/0038654 A1* | 2/2014 | Ahmadi | G06F 9/5027 |
| | | | 455/509 |

(Continued)

FOREIGN PATENT DOCUMENTS

| CN | 101674657 A | 3/2010 |
|---|---|---|
| CN | 102883449 A | 1/2013 |

(Continued)

OTHER PUBLICATIONS

Huawei et al., "Considerations on New Radio Access Mechanisms in Nr," 3GPP TSG RAN WG1 Meeting #85, R1-164371, Nanjing, China, May 23-27, 2016, 6 pages.

(Continued)

*Primary Examiner* — Gregory B Sefcheck
*Assistant Examiner* — Suk Jin Kang
(74) *Attorney, Agent, or Firm* — Slater Matsil, LLP (57) ABSTRACT

Embodiments of this application provide a network access method for a low power terminal. The method includes: finding, by a low power terminal, at least one high performance terminal in a first resource pool based on a synchronization signal and a broadcast channel of a virtual micro cell that are sent by a high performance terminal; determining, from all found high performance terminals, a first high performance terminal that needs to be used to access a network; obtaining configuration information through a broadcast channel of a virtual micro cell of the first high performance terminal, where the configuration information includes a second resource pool; and sending a random access request to the first high performance terminal by using a resource in the second resource pool.

24 Claims, 8 Drawing Sheets

High performance terminal

High performance terminal

Base station

First low power terminal

Second low power terminal (51) Int. Cl.
*H04W 72/00* (2009.01)
*H04W 72/04* (2009.01)
*H04W 88/04* (2009.01)

(52) U.S. Cl.
CPC ....... *H04W 72/0406* (2013.01); *H04W 74/02* (2013.01); *H04W 74/08* (2013.01); *H04W 88/04* (2013.01); *Y02D 30/70* (2020.08)

(56) References Cited

U.S. PATENT DOCUMENTS

| | | | | |
|---|---|---|---|---|
| 2014/0086176 A1* | 3/2014 | Liu | ..................... | H04W 72/082 370/329 |
| 2014/0086179 A1* | 3/2014 | Shi | ..................... | H04L 5/0037 370/329 |
| 2014/0328329 A1* | 11/2014 | Novlan | ..................... | H04W 56/0015 370/336 |
| 2015/0264677 A1* | 9/2015 | He | ..................... | H04L 5/0069 370/312 |
| 2016/0105860 A1* | 4/2016 | Li | ..................... | H04W 36/00 370/350 |
| 2016/0105908 A1* | 4/2016 | Li | ..................... | H04W 74/008 370/329 |
| 2016/0219541 A1* | 7/2016 | Chatterjee | ..................... | H04W 76/10 |
| 2016/0286580 A1* | 9/2016 | Liu | ..................... | H04W 74/0833 |
| 2017/0099624 A1* | 4/2017 | Baghel | ..................... | H04W 36/0072 |
| 2017/0135075 A1* | 5/2017 | Jiang | ..................... | H04W 72/1273 |
| 2017/0187558 A1* | 6/2017 | Yasukawa | ..................... | H04L 27/2607 |
| 2017/0238282 A1* | 8/2017 | Wei | ..................... | H04W 72/04 370/329 |
| 2017/0245248 A1* | 8/2017 | Lei | ..................... | H04W 76/14 |
| 2018/0007494 A1* | 1/2018 | Yi | ..................... | H04W 52/34 |
| 2018/0020459 A1* | 1/2018 | Chatterjee | ..................... | H04W 4/50 |
| 2018/0054804 A1* | 2/2018 | Luo | ..................... | H04W 72/04 |
| 2018/0132167 A1* | 5/2018 | Zhang | ..................... | H04W 48/14 |
| 2018/0263059 A1* | 9/2018 | Rosa | ..................... | H04W 74/0833 |
| 2018/0317070 A1* | 11/2018 | Li | ..................... | H04W 52/0209 |
| 2018/0332647 A1* | 11/2018 | Li | ..................... | H04W 72/048 |
| 2018/0352411 A1* | 12/2018 | Ryu | ..................... | H04W 72/085 |
| 2019/0028947 A1* | 1/2019 | Adachi | ..................... | H04W 60/00 |
| 2019/0124687 A1* | 4/2019 | Yang | ..................... | H04L 27/0006 |
| 2019/0159018 A1* | 5/2019 | Basu Mallick | ..................... | H04W 4/023 |
| 2020/0052774 A1* | 2/2020 | Basu Mallick | ..................... | H04W 8/005 |

FOREIGN PATENT DOCUMENTS

| | | |
|---|---|---|
| CN | 104619025 A | 5/2015 |
| CN | 104955162 A | 9/2015 |
| CN | 105163368 A | 12/2015 |
| CN | 105323244 A | 2/2016 |
| CN | 105338647 A | 2/2016 |
| EP | 2988542 A1 | 2/2016 |
| EP | 2898739 B1 | 9/2018 |
| WO | 2016004828 A1 | 1/2016 |

OTHER PUBLICATIONS

Samdanis, K. et al., "TD-LTE virtual cells: An SDN architecture for user-centric multi-eNB elastic resource management," Computer Communications, Jan. 13, 2016, 16 pages.

\* cited by examiner

NETWORK ACCESS METHOD FOR LOW POWER TERMINAL, AND APPARATUS

CROSS-REFERENCE TO RELATED APPLICATIONS

This application is a national stage of International Application No. PCT/CN2016/086045, filed on Jun. 16, 2016, which is hereby incorporated by reference in its entirety.

TECHNICAL FIELD

This application relates to the communications field, and in particular, to a network access method for a low power terminal, and an apparatus.

BACKGROUND

The Internet of Things (IoT) is a network obtained by extending the Internet. In the Internet of Things, things are mutually connected for information exchange and communication, and a client scope is extended to any object. A wearable device such as a watch or a headset, other virtual reality and intelligent awareness devices, and the like are an important branch of the Internet of Things.

Currently, if a low power terminal (LUE) such as a wearable device needs to be connected to the Internet, a local area network connection technology such as Wireless Fidelity (WiFi) or Bluetooth may be used, to establish a hotspot on a high performance terminal (High performance UE, HUE for short) such as a mobile terminal, that is, establish a wireless local area network that uses the mobile terminal as a center, so that data is forwarded to the low power terminal by using the wireless local area network.

However, a carrier sense-avoidance solution is used for time-frequency resource management in the existing local area network connection technology. As a result, when a large quantity of low power terminals randomly access a network, the large quantity of low power terminals may randomly occupy a same time-frequency resource, a probability of a time-frequency resource collision is increased, and a large quantity of time-frequency resources need to be consumed. Consequently, there may be a shortage of time-frequency resources, and overall network transmission performance may be greatly reduced.

SUMMARY

The present invention is intended to provide a network access method for a low power terminal, and an apparatus, so that when a large quantity of low power terminals randomly access a network, a base station performs time-frequency resource coordination and allocation, to effectively avoid a time-frequency resource conflict.

The foregoing objective and another objective are achieved by using characteristics in the independent claims. Further implementations are provided in the dependent claims, the specification, and the accompanying drawings.

According to a first aspect, a network access method for a low power terminal is provided, including the following:

First, a low power terminal finds at least one high performance terminal in a first resource pool based on a synchronization signal and a broadcast channel of a virtual micro cell that are sent by a high performance terminal, where the high performance terminal is a terminal for which the virtual micro cell has been established, and the first resource pool is time-frequency resources that are allocated by a base station and are used by high performance terminals to send synchronization signals and broadcast channels of virtual micro cells. Then, the low power terminal determines, from all found high performance terminals, a first high performance terminal that needs to be used to access a network, where the first high performance terminal has accessed the network. The low power terminal obtains configuration information through a broadcast channel of a virtual micro cell of the first high performance terminal, where the configuration information includes a second resource pool. The low power terminal sends a random access request to the first high performance terminal by using a resource in the second resource pool, so that the low power terminal accesses, by using the first high performance terminal, the network accessed by the first high performance terminal. Further, the configuration information further includes a third resource pool, and the low power terminal performs data transmission with the first high performance terminal by using a resource in the third resource pool.

In the network access method for a low power terminal provided in the foregoing first aspect, first, the low power terminal finds at least one high performance terminal in the first resource pool based on the synchronization signal and the broadcast channel of the virtual micro cell that are sent by the high performance terminal, where the first resource pool is allocated by the base station of the high performance terminal. Then, the low power terminal determines the first high performance terminal that needs to be used; obtains, through the broadcast channel of the virtual micro cell of the first high performance terminal, the configuration information that includes the second resource pool; and sends the random access request to the first high performance terminal by using the resource in the second resource pool, so that the low power terminal accesses, by using the first high performance terminal, the network accessed by the first high performance terminal. Because a time-frequency resource used to establish the virtual micro cell for the high performance terminal is obtained by applying to the base station of the high performance terminal and is coordinated and allocated by the base station, it is ensured that the high performance terminal uses the time-frequency resource in a proper and orderly manner, so that when a large quantity of low power terminals randomly access a network, a time-frequency resource conflict caused by excessively dense virtual micro cells is effectively avoided. In addition, the time-frequency resource is used through spatial multiplexing, so that consumption of access resources is reduced.

With reference to the first aspect, in a first implementation of the first aspect, the determining, by the low power terminal from all found high performance terminals, a first high performance terminal that needs to be used to access a network includes: when the low power terminal has established a connection to the first high performance terminal, determining, by the low power terminal from all the found high performance terminals, that the first high performance terminal is a high performance terminal that needs to be used to access the network.

With reference to the first implementation of the first aspect, in a second implementation of the first aspect, after the determining, by the low power terminal from all the found high performance terminals, that the first high performance terminal is a high performance terminal that needs to be used to access the network, the method further includes: determining, by the low power terminal, whether a receive power of the first high performance terminal is greater than or equal to a preset threshold; and when the receive power of the first high performance terminal is greater than or equal to the preset threshold, obtaining, by the low power terminal, the configuration information through the broadcast channel of the virtual micro cell of the first high performance terminal; or when the receive power of the first high performance terminal is less than the preset threshold, entering, by the low power terminal, a sleep state, or sending, by the low power terminal, a random access request to the base station.

With reference to the first aspect, in a third implementation of the first aspect, the determining, by the low power terminal from all found high performance terminals, a first high performance terminal that needs to be used to access a network includes: when the low power terminal does not establish a connection to any one of all the found high performance terminals, determining, by the low power terminal from all the found high performance terminals, a terminal as the first high performance terminal that needs to be used to access the network.

With reference to the third implementation of the first aspect, in a fourth implementation of the first aspect, before the determining, by the low power terminal from all the found high performance terminals, a terminal as the first high performance terminal that needs to be used to access the network, the method further includes: obtaining, by the low power terminal from all the found high performance terminals, a high performance terminal whose receive power is greater than or equal to a preset threshold; and presenting, by the low power terminal, a request message to a user, where the request message includes related information of the high performance terminal whose receive power is greater than or equal to the preset threshold in all the found high performance terminals, and the related information includes the receive power and an identifier of a virtual micro cell of the high performance terminal whose receive power is greater than or equal to the preset threshold.

With reference to the second implementation or the fourth implementation of the first aspect, in a fifth implementation of the first aspect, after the finding, by a low power terminal, at least one high performance terminal in a first resource pool based on a synchronization signal and a broadcast channel of a virtual micro cell that are sent by a high performance terminal, the method further includes: obtaining, by the low power terminal, a receive power of each of all the found high performance terminals.

With reference to any one of the first aspect, or the first implementation to the fifth implementation of the first aspect, in a sixth implementation of the first aspect, before the finding, by a low power terminal, at least one high performance terminal in a first resource pool based on a synchronization signal and a broadcast channel of a virtual micro cell that are sent by a high performance terminal, the method further includes: establishing, by the low power terminal, synchronization with the base station based on a found synchronization signal sent by the base station; receiving, by the low power terminal, a system broadcast message sent by the base station, where the system broadcast message includes a location, a width, and a repetition period of the first resource pool in system bandwidth; and parsing, by the low power terminal, the system broadcast message to obtain the location, the width, and the repetition period of the first resource pool in the system bandwidth.

According to a second aspect, a network access method for a low power terminal is provided, including: receiving, by a high performance terminal, a random access request sent by a low power terminal; determining, by the high performance terminal, to allow the low power terminal to access; and sending, by the high performance terminal, a random access response to the low power terminal, and sending, to a base station, information indicating that the low power terminal accesses a first high performance terminal.

According to a third aspect, a low power terminal is provided, including: a transceiver unit, configured to find at least one high performance terminal in a first resource pool based on a synchronization signal and a broadcast channel of a virtual micro cell that are sent by a high performance terminal, where the first resource pool is time-frequency resources that are allocated by a base station and are used by high performance terminals to send synchronization signals and broadcast channels of virtual micro cells; and a processing unit, configured to determine, from all found high performance terminals, a first high performance terminal that needs to be used to access a network, where the first high performance terminal has accessed the network, where the processing unit is further configured to obtain configuration information through a broadcast channel of a virtual micro cell of the first high performance terminal, where the configuration information includes a second resource pool; and the transceiver unit is further configured to send a random access request to the first high performance terminal by using a resource in the second resource pool, so that the low power terminal accesses, by using the first high performance terminal, the network accessed by the first high performance terminal. For a specific implementation, refer to a function of behavior of the low power terminal in the network access method for a low power terminal provided in the first aspect.

It should be noted that, the function modules in the foregoing third aspect may be implemented by hardware, or may be implemented by executing corresponding software by hardware. The hardware or the software includes one or more modules corresponding to the foregoing functions. For example, a communications interface is configured to complete a function of the transceiver unit, a processor is configured to complete a function of the processing unit, and a memory is configured to store a volume threshold. The processor, the communications interface, and the memory are connected and complete mutual communication by using a bus. For details, refer to a function of behavior of the low power terminal in the network access method for a low power terminal provided in the first aspect.

In the present invention, a name of the low power terminal imposes no limitation on the device. In actual implementation, these devices may have other names, provided that functions of the devices are similar to those in the present invention and fall within the scope of the claims of the present invention and their equivalent technologies.

These aspects or other aspects of the present invention are more concise and understandable in descriptions of the following embodiments.

BRIEF DESCRIPTION OF THE DRAWINGS

To describe the technical solutions in the embodiments of this application or in the prior art more clearly, the following briefly describes the accompanying drawings required for describing the embodiments or the prior art. Apparently, the accompanying drawings in the following description show only some embodiments of this application, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of this application with reference to the accompanying drawings in the embodiments of this application. Apparently, the described embodiments are only some but not all of the embodiments of this application. All other embodiments obtained by a person of ordinary skill in the art based on the embodiments of this application without creative efforts shall fall within the protection scope of this application.

A basic principle of the present invention is as follows: A virtual micro cell is established for a high performance terminal by using a time-frequency resource coordinated and allocated by a base station (BS) of the high performance terminal. A low power terminal finds at least one high performance terminal in a first resource pool based on a synchronization signal and a broadcast channel of the virtual micro cell that are sent by the high performance terminal, where the first resource pool is allocated by the base station of the high performance terminal. Then, the low power terminal determines a first high performance terminal that needs to be used; obtains, through a broadcast channel of a virtual micro cell of the first high performance terminal, configuration information that includes a second resource pool; and sends a random access request to the first high performance terminal by using a resource in the second resource pool, so that the low power terminal accesses, by using the first high performance terminal, a network accessed by the first high performance terminal. Because the time-frequency resource used to establish the virtual micro cell for the high performance terminal is obtained by applying to the base station of the high performance terminal and is coordinated and allocated by the base station, it is ensured that the high performance terminal uses the time-frequency resource in a proper and orderly manner, so that when a large quantity of low power terminals randomly access a network, a time-frequency resource conflict caused by excessively dense virtual micro cells is effectively avoided.

Implementations of the present invention are described in detail in the following with reference to the accompanying drawings.

It should be noted that, to help clearly describe the technical solutions in the embodiments of the present invention, the terms such as "first" and "second" are used in the embodiments of the present invention to distinguish between same or similar items with basically same functions and purposes. A person skilled in the art may understand that the terms such as "first" and "second" do not limit a quantity and an execution sequence.

In the present invention, the first resource pool may be a synchronization signal resource pool, the second resource pool may be an access channel resource pool, and a third resource pool may be a transmission channel resource pool.

Figure 1:
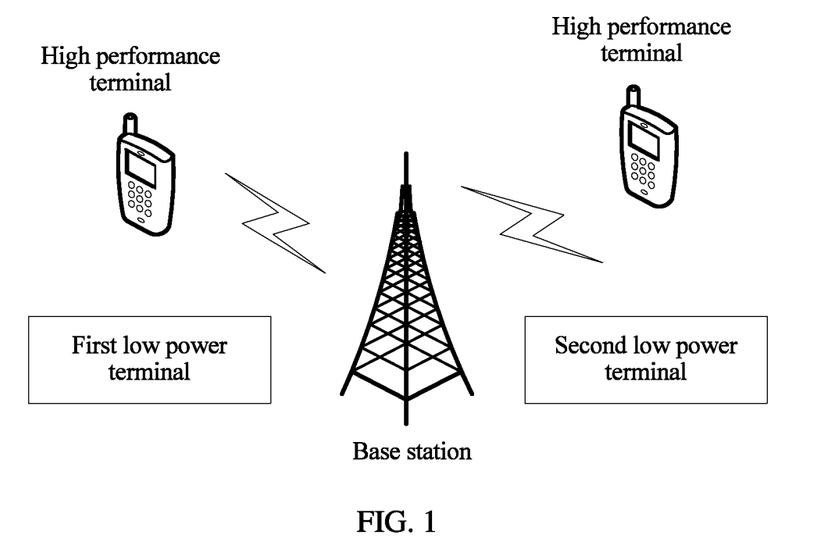
FIG. 1 is a schematic diagram of a communications system according to an embodiment of this application.

An embodiment of the present invention provides a schematic diagram of a communications system. As shown in FIG. 1, the communications system includes a base station, high performance terminals, a first low power terminal, and a second low power terminal. The high performance terminals fall within coverage of the base station, and camp on a cell deployed by the base station.

Figure 2:
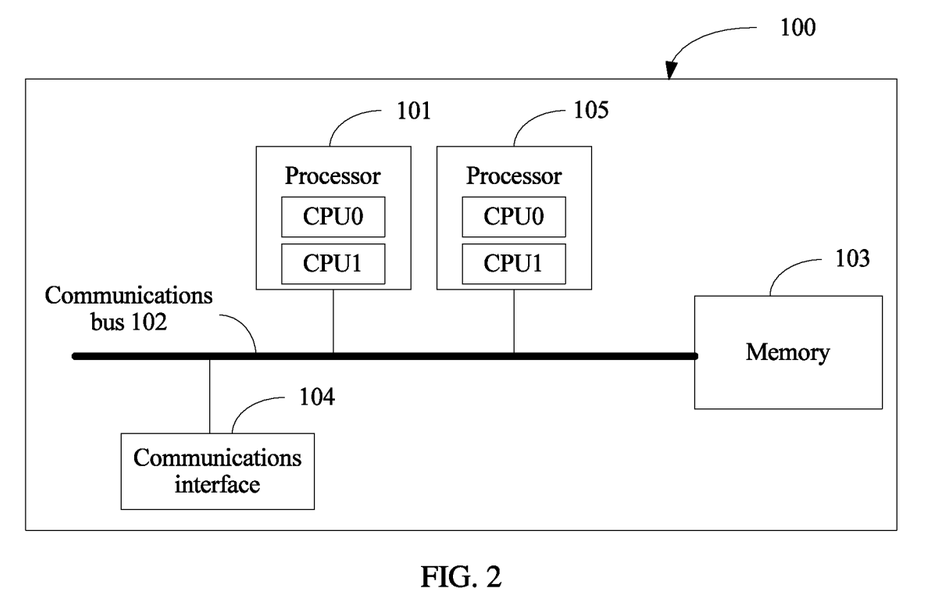
FIG. 2 is a schematic structural diagram of a computer device according to an embodiment of this application.

As shown in FIG. 2, the low power terminal in FIG. 1 may be implemented by a computer device (or a system) in FIG. 2.

FIG. 2 is a schematic diagram of a computer device according to an embodiment of the present invention. The computer device 100 includes at least one processor 101, a communications bus 102, a memory 103, and at least one communications interface 104.

The processor 101 may be one processor, or may be a collective term for a plurality of processing elements. For example, the processor 101 may be a general-purpose central processing unit (CPU), or may be an application-specific integrated circuit (ASIC), or may be one or more integrated circuits configured to control program execution of the solutions in the present invention, for example, one or more microprocessors (DSP), or one or more field programmable gate arrays (FPGA).

In specific implementation, in an embodiment, the processor 101 may include one or more CPUs, such as a CPU0 and a CPU1 in FIG. 2.

In specific implementation, in an embodiment, the computer device 100 may include a plurality of processors, such as the processor 101 and a processor 105 in FIG. 2. Each of the processors may be a single-core (single-CPU) processor or a multi-core (multi-CPU) processor. The processor herein may be one or more devices, circuits, and/or processing cores configured to process data (such as a computer program instruction).

The communications bus 102 may be an industry standard architecture (ISA) bus, a Peripheral Component Interconnect (PCI) bus, an extended industry standard architecture (EISA) bus, or the like. The bus may fall into an address bus, a data bus, a control bus, and the like. For ease of representation, only one thick line is used to represent the bus in FIG. 2, but it does not indicate that there is only one bus or only one type of bus.

The memory 103 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a disk storage medium or another disk storage device, or any other medium that can be used to carry or store expected program code in an instruction or data structure form and can be accessed by a computer. However, no limitation is imposed on the memory. The memory may exist independently, and is connected to the processor by using the bus. Alternatively, the memory may be integrated with the processor.

The memory 103 is configured to store application program code for executing the solutions in the present invention, and the application program code is controlled by the processor 101 for execution. The processor 101 is configured to execute the application program code stored in the memory 103.

The communications interface 104 may be any apparatus of a transceiver type, and is configured to communicate with another device or communications network, such as the Ethernet, a radio access network (RAN), or a wireless local area network (WLAN). The communications interface 104 may include a receiving unit for implementing a receiving function, and a sending unit for implementing a sending function.

In specific implementation, in an embodiment, the computer device wo shown in FIG. 2 may be the low power terminal in FIG. 1.

The processor 101 is configured to determine, from all found high performance terminals, a first high performance terminal that needs to be used to access a network.

The communications interface 104 is configured to find at least one high performance terminal in a first resource pool based on a synchronization signal and a broadcast channel of a virtual micro cell that are sent by a high performance terminal.

The communications interface 104 is further configured to obtain configuration information through a broadcast channel of a virtual micro cell of the first high performance terminal.

The communications interface 104 is further configured to send a random access request to the first high performance terminal by using a resource in a second resource pool.

Embodiment 1

Figure 3:
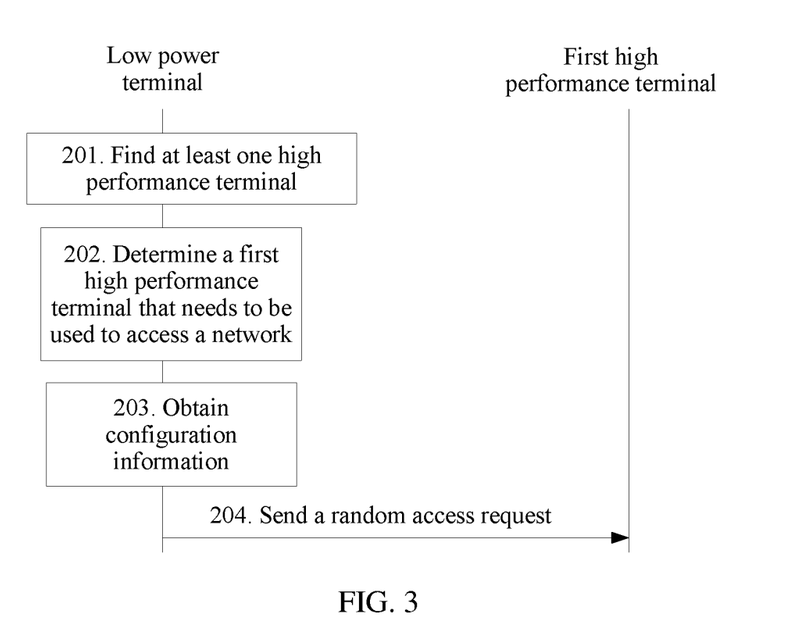
FIG. 3 is a flowchart of a network access method for a low power terminal according to an embodiment of this application.

This embodiment of the present invention provides a network access method for a low power terminal. As shown in FIG. 3, the method includes the following steps.

Step 201. A low power terminal finds at least one high performance terminal in a first resource pool based on a synchronization signal and a broadcast channel of a virtual micro cell that are sent by a high performance terminal.

The high performance terminal is a terminal for which the virtual micro cell has been established. The first resource pool is time-frequency resources allocated by a base station of all high performance terminals, and is time-frequency resources that are allocated by the base station and are used by the high performance terminals to send synchronization signals and broadcast channels of virtual micro cells. Virtual micro cells are established for all the high performance terminals by using resources in the first resource pool.

A resource format of the synchronization channel of the virtual micro cell and that of the broadcast channel of the virtual micro cell are consistent with a frame format in an existing standard. Therefore, while forward compatibility is ensured, it is beneficial for supporting a plurality of low power terminals that have different bandwidth and different transmission performance and power consumption requirements.

Figure 4:
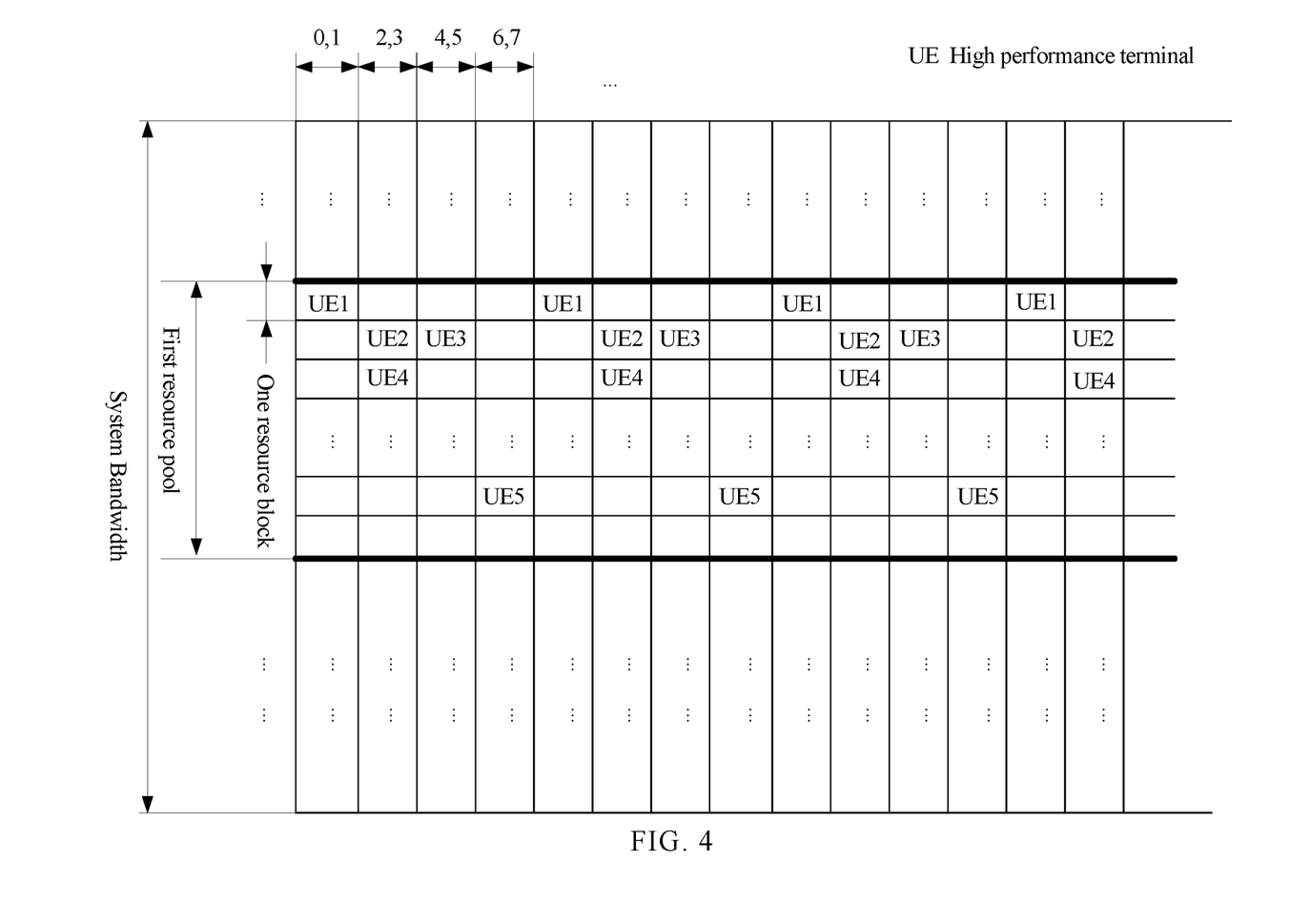
FIG. 4 is a schematic structural diagram of a first resource pool according to an embodiment of this application.

As shown in FIG. 4, FIG. 4 is a schematic structural diagram of the first resource pool. First, the base station reserves a resource pool in system bandwidth, and the resource pool is used to establish the virtual micro cell for the high performance terminal. The system bandwidth may be system bandwidth in downlink transmission or system bandwidth in uplink transmission. The first resource pool occupies some time-frequency resources in the system bandwidth and all time slots. A center location and a width of the first resource pool may be configured by the base station, and is described in system information. The base station may perform semi-static configuration on a center, the width, and the like of the first resource pool based on feedback of a large quantity of high performance terminals, for example, channel quality.

A smallest particle in the first resource pool has bandwidth of one resource block and duration of two subframes. If a virtual micro cell needs to be established for a high performance terminal, some time-frequency resources in the smallest particle may be occupied based on a period, and the resources are used as synchronization resources of the virtual micro cell. The synchronization resources may include a synchronization signal, a broadcast channel of the virtual micro cell, and the like. A physical layer format of the information may be consistent with design of a synchronization signal in a subframe in the Narrowband Internet of Things (NB-IoT) in existing LTE, to minimize modification of a standard. Each high performance terminal may periodically send a synchronization signal and a broadcast channel of a virtual micro cell established for the high performance terminal. A period may be a system parameter, and is configured at a higher layer in a quasi-static manner. The period shown in FIG. 4 may be 4, that is, a length of eight radio frames.

Step 202. The low power terminal determines, from all found high performance terminals, a first high performance terminal that needs to be used to access a network.

The first high performance terminal has accessed the network.

Step 203. The low power terminal obtains configuration information through a broadcast channel of a virtual micro cell of the first high performance terminal.

The configuration information includes a second resource pool.

Step 204. The low power terminal sends a random access request to the first high performance terminal by using a resource in a second resource pool.

In this way, after completing initial access, the low power terminal in a connected mode may even directly search for the synchronization signal of the virtual micro cell established for the high performance terminal, to send a random access request related to data transmission. Because a time-frequency resource used to establish the virtual micro cell for the high performance terminal is obtained by applying to the base station of the high performance terminal and is coordinated and allocated by the base station, it is ensured that the high performance terminal uses the time-frequency resource in a proper and orderly manner, so that when a large quantity of low power terminals randomly access a network, a time-frequency resource conflict caused by excessively dense virtual micro cells is effectively avoided.

The method steps shown in FIG. 3 may be specifically implemented by the computer device shown in FIG. 2. For example, the method steps such as step 203 and step 204 may be implemented by the communications interface 104. The method steps such as step 201 and step 202 may be implemented by the processor 101.

Specifically, when determining, from all the high performance terminals, the first high performance terminal that needs to be used to access the network, the low power terminal may determine whether pairing has been performed between the high performance terminal and the low power terminal, that is, whether a high performance terminal that has established a connection to the low power terminal exists in the found high performance terminals, to determine a high performance terminal that needs to be used.

Figure 5A:
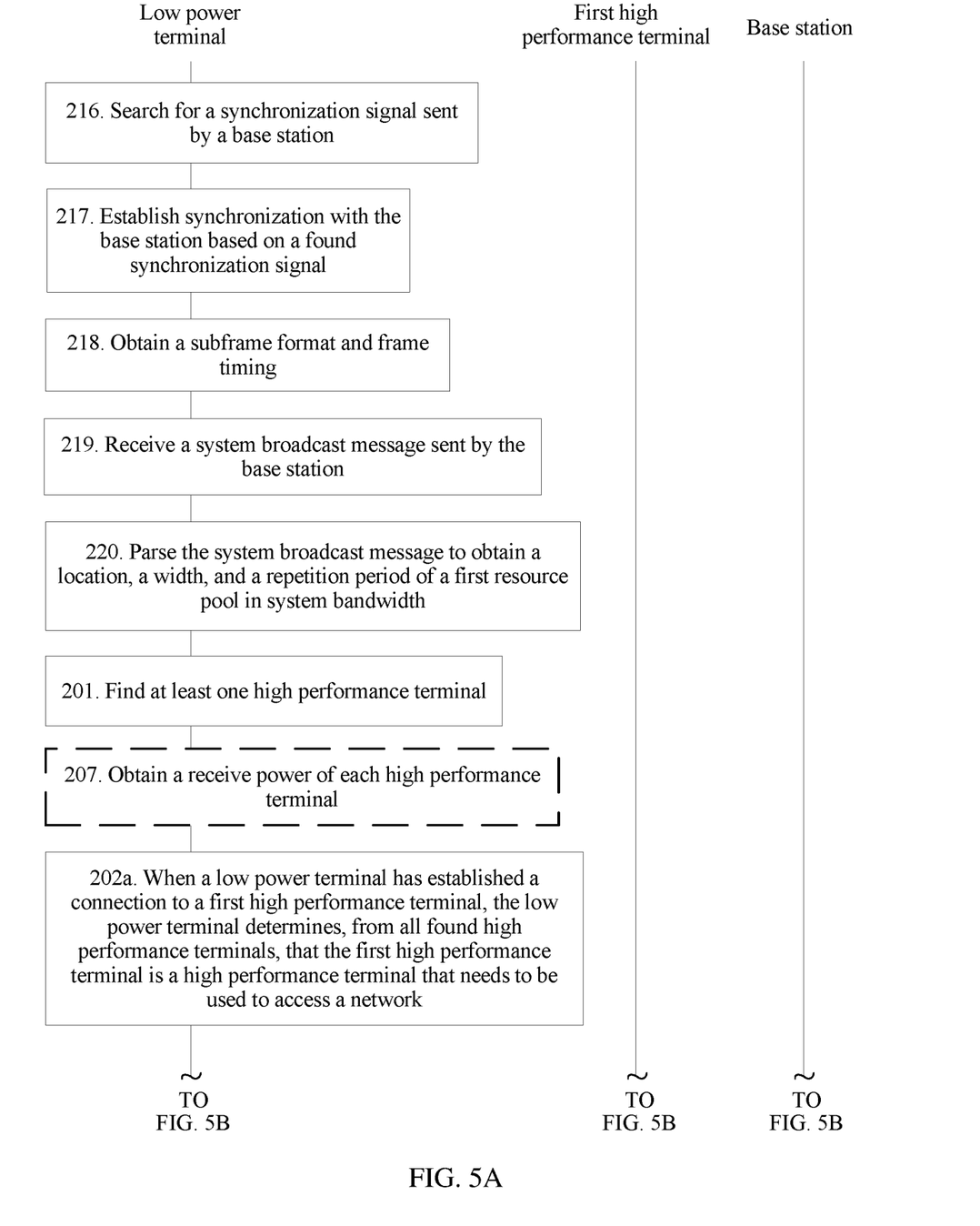
FIG. 5A and FIG. 5B are a flowchart of another network access method for a low power terminal according to an embodiment of this application.

On a basis of FIG. 3, as shown in FIG. 5A, the following step may be specifically included:

Step 202a. When the low power terminal has established a connection to the first high performance terminal, the low power terminal determines, from all the found high performance terminals, that the first high performance terminal is a high performance terminal that needs to be used to access the network.

Further, after step 202a: when the low power terminal has established a connection to the first high performance terminal, the low power terminal determines, from all the found high performance terminals, that the first high performance terminal is a high performance terminal that needs to be used to access the network, the low power terminal may further perform the following step:

Step 205. The low power terminal determines whether a receive power of the first high performance terminal is greater than or equal to a preset threshold.

When the receive power of the first high performance terminal is greater than or equal to the preset threshold, step 203 is performed. When the receive power of the first high performance terminal is less than the preset threshold, step 206a or step 206b is performed.

Step 206a. The low power terminal enters a sleep state.

Step 206b. The low power terminal sends a random access request to a base station.

Optionally, after step 201: a low power terminal finds at least one high performance terminal in a first resource pool based on a synchronization signal and a broadcast channel of a virtual micro cell that are sent by a high performance terminal, the low power terminal may further perform step 207.

Step 207. The low power terminal obtains a receive power of each high performance terminal.

This helps the low power terminal perform a specific step based on the receive power of the high performance terminal.

Figure 6A:
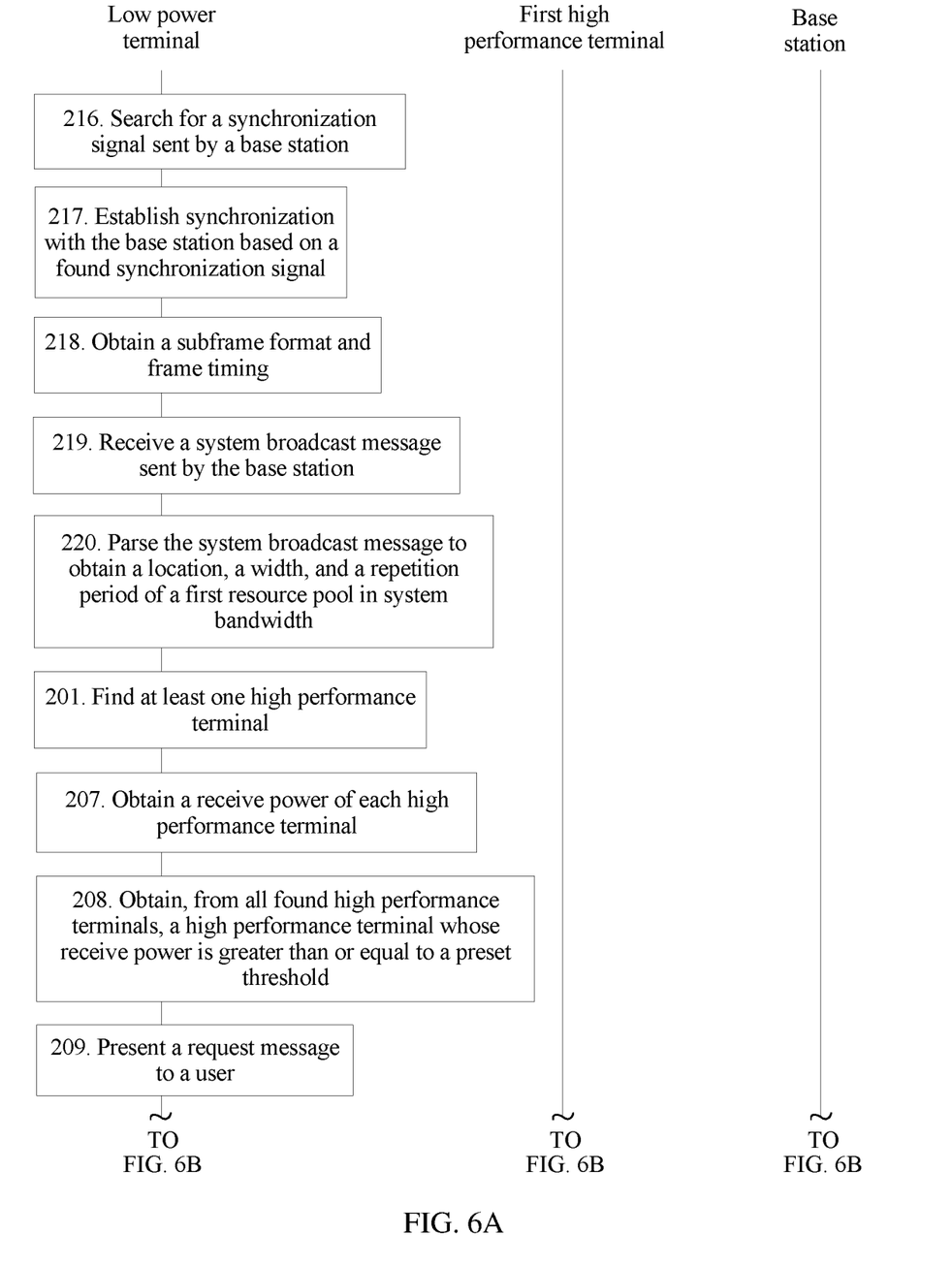
FIG. 6A and FIG. 6B are a flowchart of still another network access method for a low power terminal according to an embodiment of this application.
Figure 6B:
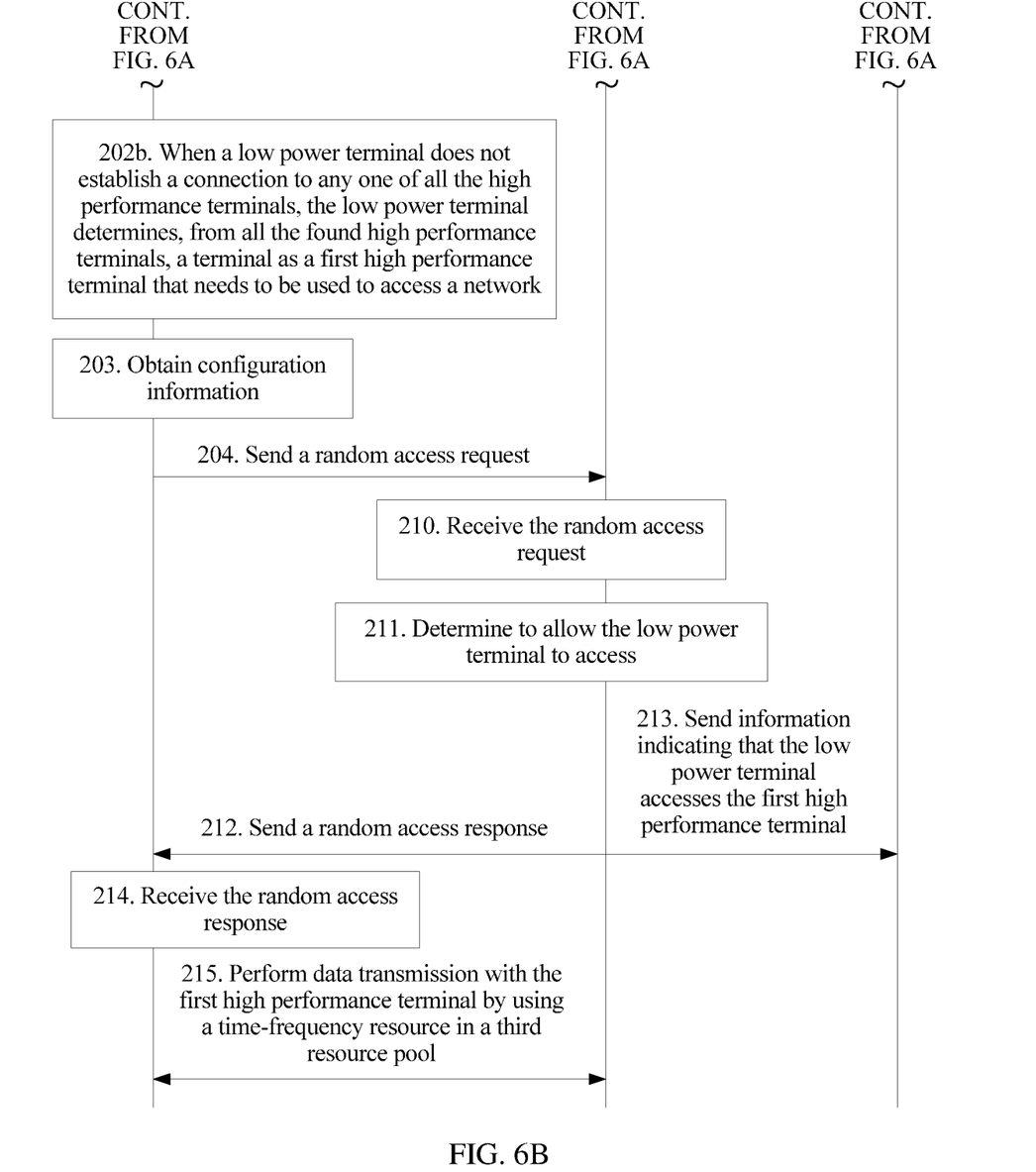

On a basis of FIG. 3, as shown in FIG. 6B, the following step may be specifically included:

Step 202b. When the low power terminal does not establish a connection to any one of all the high performance terminals, the low power terminal determines, from all the found high performance terminals, a terminal as the first high performance terminal that needs to be used to access the network.

Specifically, before step 202b: when the low power terminal does not establish a connection to any one of all the high performance terminals, the low power terminal determines, from all the found high performance terminals, a terminal as the first high performance terminal that needs to be used to access the network, the low power terminal may further perform step 208 and step 209, and a user determines, from all the found high performance terminals, a terminal as the first high performance terminal that needs to be used to access the network.

Step 208. The low power terminal obtains, from all the found high performance terminals, a high performance terminal whose receive power is greater than or equal to a preset threshold.

Step 209. The low power terminal presents a request message to a user.

The request message includes related information of the high performance terminal whose receive power is greater than or equal to the preset threshold in all the found high performance terminals. The related information includes the receive power and an identifier of a virtual micro cell of the high performance terminal whose receive power is greater than or equal to the preset threshold. In other words, the user determines, from the high performance terminal whose receive power is greater than or equal to the preset threshold, a terminal as the first high performance terminal that needs to be used to access the network.

Further, after step 201: a low power terminal finds at least one high performance terminal in a first resource pool based on a synchronization signal and a broadcast channel of a virtual micro cell that are sent by a high performance terminal, the low power terminal may further perform step 207.

Step 207. The low power terminal obtains a receive power of each high performance terminal.

This helps the low power terminal perform a specific step based on the receive power of the high performance terminal.

Figure 5B:
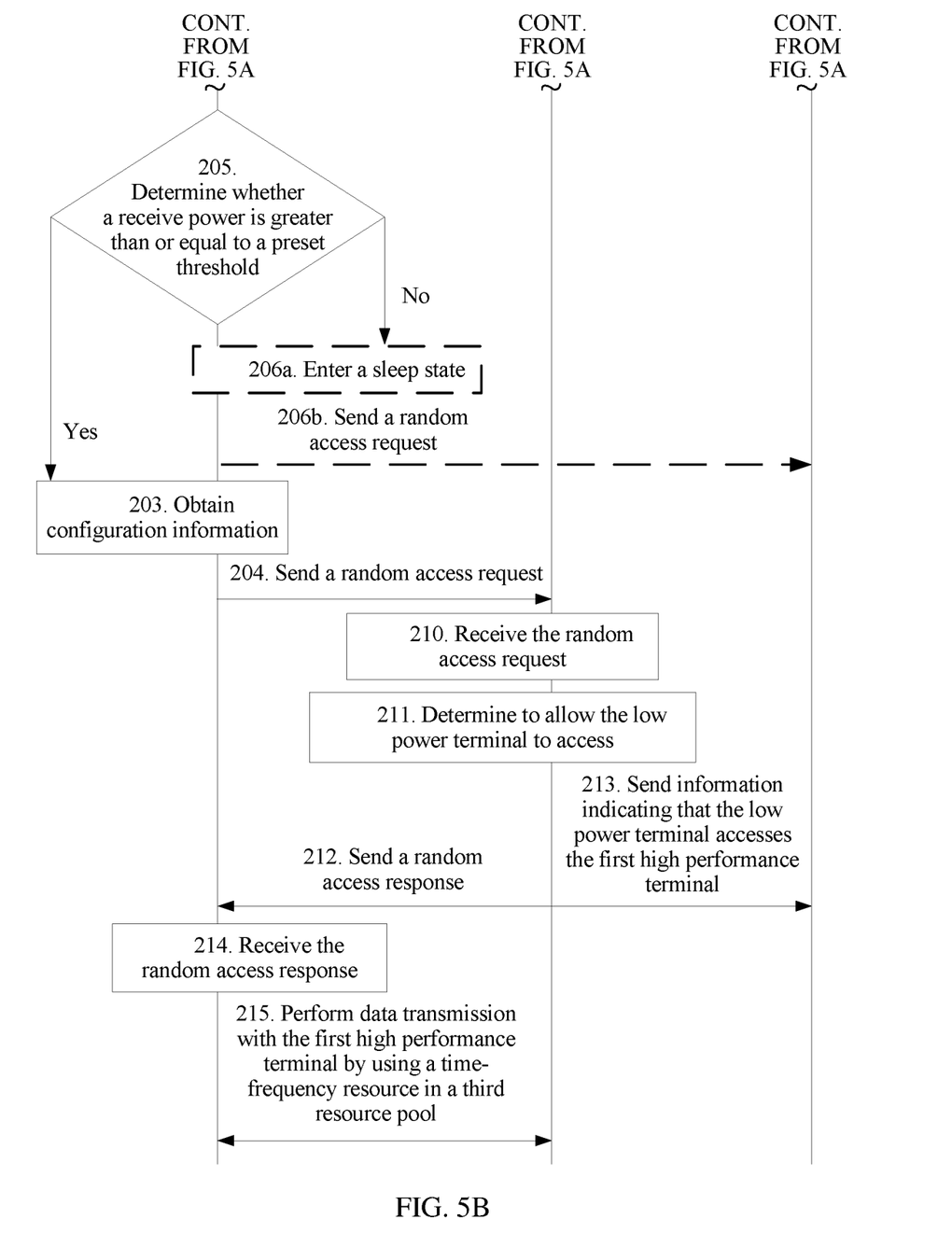

Further, on a basis of FIG. 5A and FIG. 5B and FIG. 6A and FIG. 6B, after step 204: the low power terminal sends a random access request to the first high performance terminal by using a resource in a second resource pool, the first high performance terminal may further perform the following steps:

Step 210. The first high performance terminal receives the random access request sent by the low power terminal.

Step 211. The first high performance terminal determines to allow the low power terminal to access.

Step 212. The first high performance terminal sends a random access response to the low power terminal.

Step 213. The first high performance terminal sends, to the base station, information indicating that the low power terminal accesses the first high performance terminal.

It should be noted that, a sequence of step 212 and step 213 is not limited. In other words, step 213 may be performed before step 212.

Step 214. The low power terminal receives the random access response sent by the first high performance terminal.

It should be noted that, the configuration information obtained by the low power terminal in step 203 through the broadcast channel of the virtual micro cell of the first high performance terminal further includes a third resource pool. Further, the low power terminal performs step 215 based on a time-frequency resource in the third resource pool.

Step 215. The low power terminal performs data transmission with the first high performance terminal by using a time-frequency resource in a third resource pool.

Before step 201: a low power terminal finds at least one high performance terminal in a first resource pool based on a synchronization signal and a broadcast channel of a virtual micro cell that are sent by a high performance terminal, the low power terminal needs to perform synchronization with the base station first. This process specifically includes the following steps:

Step 216. The low power terminal searches for a synchronization signal sent by the base station.

Step 217. The low power terminal establishes synchronization with the base station based on a found synchronization signal.

Step 218. The low power terminal obtains a subframe format and frame timing.

Step 219. The low power terminal receives a system broadcast message sent by the base station.

The system broadcast message includes a location, a width, and a repetition period of the first resource pool in the system bandwidth.

Step 220. The low power terminal parses the system broadcast message to obtain a location, a width, and a repetition period of the first resource pool in system bandwidth.

This helps the low power terminal obtain a frequency band of the first resource pool based on the location, the width, and the repetition period of the first resource pool in the system bandwidth, and find at least one high performance terminal based on the synchronization signal and the broadcast channel of the virtual micro cell that are sent by the high performance terminal.

In this way, the low power terminal first synchronizes with the base station, and then synchronizes with the virtual micro cell established for the high performance terminal. Therefore, information such as a subframe configuration type and subframe timing may be obtained through synchronization with the base station, and the second resource pool and the third resource pool are obtained through further synchronization with the micro cell.

It should be noted that, if the low power terminal needs to send only data information to the high performance terminal, the low power terminal does not need to access a macro cell that uses the base station as a center, and may directly access the virtual micro cell established for the high performance terminal.

The second resource pool and the third resource pool are separated in frequency domain, an access channel and an access procedure of the virtual micro cell are designed in a licensed spectrum of a telecommunications network, and a data channel procedure that is based on a "listen before talk" mechanism is designed in an unlicensed spectrum. In this way, the unlicensed spectrum may be properly and effectively used while access performance of a plurality of users is ensured.

If a low power terminal on an edge of the macro cell needs to communicate with a network, compared with a manner of connecting to the base station relatively far from the low power terminal, connecting to the virtual micro cell that uses the high performance terminal as a center greatly reduces power consumption of the low power terminal.

Embodiment 2

Figure 7:
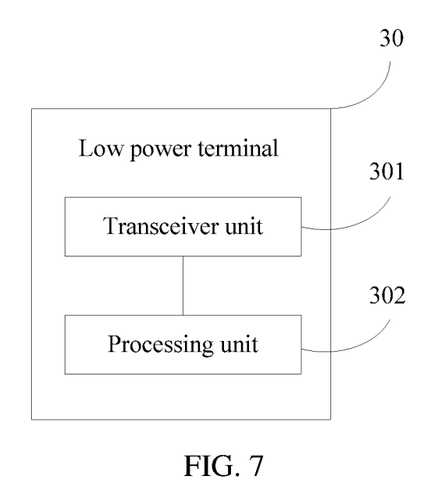
FIG. 7 is a schematic structural diagram of a low power terminal according to an embodiment of this application.

This embodiment of the present invention provides a low power terminal 30. As shown in FIG. 7, the low power terminal 30 includes: a transceiver unit 301, configured to find at least one high performance terminal in a first resource pool based on a synchronization signal and a broadcast channel of a virtual micro cell that are sent by a high performance terminal, where the high performance terminal is a terminal for which the virtual micro cell has been established, and the first resource pool is time-frequency resources that are allocated by a base station and are used by all high performance terminals to send synchronization signals and broadcast channels of virtual micro cells; and a processing unit 302, configured to determine, from all found high performance terminals, a first high performance terminal that needs to be used to access a network, where the first high performance terminal has accessed the network.

The processing unit 302 is further configured to obtain configuration information through a broadcast channel of a virtual micro cell of the first high performance terminal, where the configuration information includes a second resource pool.

The transceiver unit 301 is further configured to send a random access request to the first high performance terminal by using a resource in the second resource pool, so that the low power terminal accesses, by using the first high performance terminal, the network accessed by the first high performance terminal.

In this way, because a time-frequency resource used to establish the virtual micro cell for the high performance terminal is obtained by applying to the base station of the high performance terminal and is coordinated and allocated by the base station, it is ensured that the high performance terminal uses the time-frequency resource in a proper and orderly manner, so that when a large quantity of low power terminals randomly access a network, a time-frequency resource conflict caused by excessively dense virtual micro cells is effectively avoided.

In this embodiment, the low power terminal 30 is presented in a form of a function unit. The "unit" herein may be an application-specific integrated circuit (ASIC), a processor and a memory that execute one or more software or firmware programs, an integrated logic circuit, and/or another device that can provide the foregoing functions. In a simple embodiment, a person skilled in the art may figure out that the form shown in FIG. 7 may be used for the low power terminal 30. The transceiver unit 301 and the processing unit 302 may be implemented by the computer device in FIG. 2. Specifically, the transceiver unit 301 may be implemented by the communications interface 104, and the processing unit 302 may be implemented by the processor 101.

A person of ordinary skill in the art may understand that all or some of the steps of the method embodiments may be implemented by a program instructing relevant hardware. The program may be stored in a computer readable storage medium. When the program is executed, the steps of the method embodiments are performed. The foregoing storage medium includes: any medium that can store program code, such as a read-only memory (ROM), a random access memory (RAM), a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A method, comprising:
finding, by a low power terminal, a plurality of high performance terminals in a first resource pool based on a synchronization signal and a broadcast channel of a first virtual micro cell,
wherein the synchronization signal and the broadcast channel of the first virtual micro cell are sent by a first high performance terminal of the plurality of high performance terminals,
wherein the first virtual micro cell is established for the first high performance terminal,
wherein the first resource pool comprises a plurality of time-frequency resources,
wherein the plurality of time-frequency resources are allocated by a base station and are used by all of the plurality of high performance terminals including the first high performance terminal within a coverage area of the base station to send synchronization signals and broadcast channels of virtual micro cells,
wherein the plurality of time-frequency resources are coordinated by the base station such that the plurality of time-frequency resources occupy all time slots and each time-frequency resource of the plurality of time-frequency resources is used by at most one of the plurality of high performance terminals for sending a corresponding synchronization signal and a corresponding broadcast channel, and wherein the plurality of high performance terminals within the coverage area of the base station further includes a second high performance terminal using the first resource pool for a second synchronization signal and a second broadcast channel of a second virtual micro cell of the virtual micro cells;

determining, by the low power terminal from the plurality of high performance terminals, the second high performance terminal to use to access a network, wherein the second high performance terminal is different from the first high performance terminal, and wherein the second high performance terminal has previously accessed the network;

obtaining, by the low power terminal, configuration information through the second broadcast channel of the second virtual micro cell of the second high performance terminal, wherein the second broadcast channel is sent by the second high performance terminal using the first resource pool, and wherein the configuration information indicates a second resource pool; and sending, by the low power terminal, a random access request to the second high performance terminal using a resource in the second resource pool, wherein the low power terminal accesses, using the second high performance terminal, the network previously accessed by the second high performance terminal.

2. The method according to claim 1, wherein the determining, by the low power terminal from the plurality of high performance terminals, the second high performance terminal to use to access the network comprises:

when the low power terminal has established a connection to the second high performance terminal, determining, by the low power terminal from the plurality of high performance terminals, the second high performance terminal to use to access the network.

3. The method according to claim 2, wherein after the determining, by the low power terminal from the plurality of high performance terminals, the second high performance terminal to use to access the network, the method further comprises:

determining, by the low power terminal, whether a receive power of the second high performance terminal is greater than or equal to a preset threshold;

when the receive power of the second high performance terminal is greater than or equal to the preset threshold, obtaining, by the low power terminal, the configuration information through the second broadcast channel of the second virtual micro cell of the second high performance terminal; and when the receive power of the second high performance terminal is less than the preset threshold, entering, by the low power terminal, a sleep state, or sending, by the low power terminal, another random access request to the base station.

4. The method according to claim 1, wherein the determining, by the low power terminal from the plurality of high performance terminals, the second high performance terminal to use to access the network comprises:

when the low power terminal has not previously established a connection to any one of the plurality of high performance terminals, determining, by the low power terminal from the plurality of high performance terminals, the second high performance terminal to use to access the network.

5. The method according to claim 4, Wherein before the determining, by the low power terminal from the plurality of high performance terminals, the second high performance terminal to use to access the network, the method further comprises:

obtaining, by the low power terminal from the plurality of high performance terminals, a high performance terminal whose receive power is greater than or equal to a preset threshold; and presenting, by the low power terminal, a request message to a user, wherein the request message comprises related information of the high performance terminal whose receive power is greater than or equal to the preset threshold, and the related information comprises the receive power and an identifier of a virtual micro cell of the high performance terminal whose receive power is greater than or equal to the preset threshold.

6. The method according to claim 1, wherein before the finding, by the low power terminal, the plurality of high performance terminals in the first resource pool based on the synchronization signal and the broadcast channel of the first virtual icro cell, the method further comprises:

establishing, by the low power terminal, synchronization with the base station based on a found synchronization signal sent by the base station;

receiving, by the low power terminal, a system broadcast message sent by the base station, wherein the system broadcast message comprises a location, a width, and a repetition period of the first resource pool in a system bandwidth; and parsing, by the low power terminal, the system broadcast message to obtain the location, the width, and the repetition period of the first resource pool in the system bandwidth.

7. The method of claim 1, wherein each time-frequency resource of the plurality of time-frequency resources occupies one resource block in a frequency domain and two subframes in a time domain.

8. The method of claim 1, further comprising:

determining, by the low power terminal, that no pairing has been performed between the low power terminal and any of the plurality of high performance terminals; and obtaining, by the low power terminal, a corresponding receive power of each of the plurality of high performance terminals, wherein the determining the second high performance terminal to use to access the network comprises:

selecting, by the low power terminal, the second high performance terminal to use to access the network based on a receive power of the second high performance terminal being greater than or equal to a preset threshold.

9. The method of claim 1, wherein the determining the second high performance terminal to use to access the network comprises:

selecting, by the low power terminal, the second high performance terminal to use to access the network based on determination that pairing has been performed between the low power terminal and the second high performance terminal, and wherein the obtaining the configuration information comprises:

obtaining, by the low power terminal, a receive power of the second high performance terminal; and obtaining, by the low power terminal, the configuration information through the second broadcast channel of the second virtual micro cell of the second high performance terminal based on determination that the receive power of the second high performance terminal being greater than or equal to a preset threshold.

10. A non-transitory memory storing a program, wherein the program comprises instructions for:
  finding a plurality of high performance terminals in a first resource pool based on a synchronization signal and a broadcast channel of a first virtual micro cell,
  wherein the synchronization signal and the broadcast channel of the first virtual micro cell are sent by a first high performance terminal,
  wherein the first virtual micro cell is established for the first high performance terminal,
  wherein the first resource pool comprises a plurality of time-frequency resources,
  wherein the plurality of time-frequency resources are allocated by a base station and are used by all of the plurality of high performance terminals including the first high performance terminal in a coverage area of the base station to send synchronization signals and broadcast channels of virtual micro cells,
  wherein the plurality of time-frequency resources are coordinated by the base station such that the plurality of time-frequency resources occupy all time slots and each time-frequency resource of the plurality of time-frequency resources is used by at most one of the plurality of high performance terminals for sending a corresponding synchronization signal and a corresponding broadcast channel, and
  wherein the plurality of all high performance terminals within the coverage area of the base station further includes a second high performance terminal using the first resource pool for a second synchronization signal and a second broadcast channel of a second virtual micro cell of the virtual micro cells;
  determining, from the plurality of high performance terminals, the second high performance terminal to use to access a network, wherein the second high performance terminal is different from the first high performance terminal, and wherein the second high performance terminal has previously accessed the network;
  obtaining configuration information through the second broadcast channel of the second virtual micro cell of the second high performance terminal, wherein the second broadcast channel is sent by the second high performance terminal using the first resource pool, and wherein the configuration information indicates a second resource pool; and
  sending a random access request to the second high performance terminal using a resource in the second resource pool, wherein the non-transitory memory is comprised in a low power terminal, and the low power terminal accesses, using the second high performance terminal, the network previously accessed by the second high performance terminal.

11. The non-transitory memory according to claim 10, wherein the instructions for determining the second high performance terminal to use to access the network comprise instructions for:
  when the low power terminal has established a connection to the second high performance terminal, determining, from the plurality of high performance terminals, the second high performance terminal to use to access the network.

12. The non-transitory memory according to claim 11, wherein the program further comprises instructions for:
  determining whether a receive power of the second high performance terminal is greater than or equal to a preset threshold;
  when the receive power of the second high performance terminal is greater than or equal to the preset threshold, obtaining the configuration information through the second broadcast channel of the second virtual micro cell of the second high performance terminal; and
  when the receive power of the second high performance terminal is less than the preset threshold, entering a sleep state, or sending another random access request to the base station.

13. The non-transitory memory according to claim 10, wherein the instructions for determining the second high performance terminal to use to access the network comprise instructions for:
  when the low power terminal has not previously established a connection to any one of the plurality of high performance terminals, determining, by the low power terminal from the plurality of high performance terminals, the second high performance terminal to use to access the network.

14. The non-transitory memory according to claim 13, wherein the program further comprises instructions for:
  obtaining, from all the plurality of high performance terminals, a high performance terminal whose receive power is greater than or equal to a preset threshold; and
  presenting, using a display, a request message to a user, wherein the request message comprises related information of the high performance terminal whose receive power is greater than or equal to the preset threshold in the plurality of high performance terminals, and the related information comprises the receive power and an identifier of a virtual micro cell of the high performance terminal whose receive power is greater than or equal to the preset threshold.

15. The non-transitory memory according to claim 10, wherein the program further comprises instructions for:
  obtaining a receive power of each of the plurality of high performance terminals, and wherein the determining comprises:
  determining the second high performance terminal based on the receive power of the each of the plurality of high performance terminals.

16. The non-transitory memory according to claim 10, wherein the program further comprises instructions for:
  establishing synchronization with the base station based on a found synchronization signal sent by the base station;
  receiving a system broadcast message sent by the base station, wherein the system broadcast message comprises a location, a width, and a repetition period of the first resource pool in a system bandwidth; and
  parsing the system broadcast message to obtain the location, the width, and the repetition period of the first resource pool in the system bandwidth.

17. A low power terminal, comprising:
  a transceiver, configured to:
    find a plurality of high performance terminals in a first resource pool based on a synchronization signal and a broadcast channel of a first virtual micro cell,
    wherein the synchronization signal and the broadcast channel of the first virtual micro cell are sent by a first high performance terminal, wherein the first virtual micro cell is established for the first high performance terminal, wherein the first resource pool comprises a plurality of time-frequency resources, wherein the plurality of time-frequency resources are allocated by a base station and are used by all of the plurality of high performance terminals including the first high performance terminal in a coverage area of the base station to send synchronization signals and broadcast channels of virtual micro cells, wherein the plurality of time-frequency resources are coordinated by the base station such that the plurality of time-frequency resources occupy all time slots and each time-frequency resource of the plurality of time-frequency resources is used by at most one of the plurality of high performance terminals for sending a corresponding synchronization signal and a corresponding broadcast channel, and wherein the plurality of high performance terminals within the coverage area of the base station further includes a second high performance terminal using the first resource pool for a second synchronization signal and a second broadcast channel of a second virtual micro cell of the virtual micro cells; and at least one processor, configured to:

determine, from the plurality of high performance terminals, the second high performance terminal to use to access a network, wherein the second broadcast channel is sent by the second high performance terminal using the first resource pool, wherein the second high performance terminal is different from the first high performance terminal, and wherein the second high performance terminal has previously accessed the network; and obtain configuration information through the second broadcast channel of the second virtual micro cell of the second high performance terminal, wherein the second broadcast channel is sent by the second high performance terminal using the first resource pool, and wherein the configuration information comprises a second resource pool; and wherein the transceiver is further configured to:

send a random access request to the second high performance terminal using a resource in the second resource pool, wherein the low power terminal accesses, using the second high performance terminal, the network previously accessed by the second high performance terminal.

18. The low power terminal according to claim 17, wherein the at least one processor is configured to:

when the low power terminal has established a connection to the second high performance terminal, determine, by the low power terminal from the plurality of high performance terminals, the second high performance terminal to use to access the network.

19. The tow power terminal according to claim 18, wherein the at least one processor is further configured to:

determine whether a receive power of the second high performance terminal is greater than or equal to a preset threshold;

when the receive power of the second high performance terminal is greater than or equal to the preset threshold, obtain the configuration information through the second broadcast channel of the second virtual micro cell of the second high performance terminal; and when the receive power of the second high performance terminal is less than the preset threshold, enter a sleep state, or send another random access request to the base station.

20. The low power terminal according to claim 19, wherein the at least one processor is further configured to:

obtain a receive power of each of the plurality of high performance terminals, and wherein the at least one processor is further configured to:

determine the second high performance terminal based on the receive power of the each of the plurality of high performance terminals.

21. The low power terminal according to claim 17, wherein the at least one processor is configured to:

when the low power terminal has not previously established a connection to any one of the plurality of high performance terminals, determine, by the low power terminal from the plurality of high performance terminals, the second high performance terminal to use to access the network.

22. The low power terminal according to claim 21, wherein:

the at least one processor is further configured to: obtain, from the plurality of high performance terminals, a high performance terminal whose receive power is greater than or equal to a preset threshold;

the low power terminal further comprises a display; and the display is configured to present a request message to a user, wherein the request message comprises related information of the high performance terminal whose receive power is greater than or equal to the preset threshold in the plurality of high performance terminals, and the related information comprises the receive power and an identifier of a virtual micro cell of the high performance terminal whose receive power is greater than or equal to the preset threshold.

23. The low power terminal according to claim 17, wherein:

the transceiver is further configured to establish synchronization with the base station based on a found synchronization signal sent by the base station;

the transceiver is further configured to receive a system broadcast message sent by the base station, wherein the system broadcast message comprises a location, a width, and a repetition period of the first resource pool in a system bandwidth; and the at least one processor is further configured to parse the system broadcast message to obtain the location, the width, and the repetition period of the first resource pool in the system bandwidth.

24. The method according to claim 1, wherein the low power terminal sends the random access request to the second high performance terminal in a licensed spectrum, and wherein the low power terminal transmits data to the second high performance terminal using a listen-before-talk mechanism in an unlicensed band.

* * * * *

UNITED STATES PATENT AND TRADEMARK OFFICE
CERTIFICATE OF CORRECTION

PATENT NO. : 11,206,688 B2
APPLICATION NO. : 16/310202
DATED : December 21, 2021
INVENTOR(S) : Yanliang Sun et al.

It is certified that error appears in the above-identified patent and that said Letters Patent is hereby corrected as shown below:

In the Claims

Claim 5, Column 14, Line 1; delete "claim 4, Wherein" and insert --claim 4, wherein--.

Claim 6, Column 14, Line 22; delete "virtual icro cell" and insert --virtual micro cell--.

Claim 19, Column 17, Line 56; delete "The tow power" and insert --The low power--.

Signed and Sealed this
Eighth Day of February, 2022

Drew Hirshfeld
*Performing the Functions and Duties of the
Under Secretary of Commerce for Intellectual Property and
Director of the United States Patent and Trademark Office*